US012374302B2

(12) United States Patent
Pan et al.

(10) Patent No.: US 12,374,302 B2
(45) Date of Patent: Jul. 29, 2025

(54) LOCAL DIMMING DRIVE CIRCUIT, METHOD, SYSTEM AND ELECTRONIC EQUIPMENT

(71) Applicant: SHENZHEN SKYWORTH-RGB ELECTRONIC CO., LTD., Shenzhen (CN)

(72) Inventors: Qiaofu Pan, Shenzhen (CN); Jianhua Zhou, Shenzhen (CN); Xiangfeng Hu, Shenzhen (CN); Wenxiang Yang, Shenzhen (CN); Deqiang Huang, Shenzhen (CN); Yawei Li, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/636,758

(22) Filed: Apr. 16, 2024

(65) Prior Publication Data

US 2024/0274093 A1 Aug. 15, 2024

Related U.S. Application Data

(63) Continuation of application No. PCT/CN2021/142091, filed on Dec. 28, 2021.

(30) Foreign Application Priority Data

Nov. 22, 2021 (CN) ......................... 202111389985.8

(51) Int. Cl.
*G09G 3/34* (2006.01)

(52) U.S. Cl.
CPC ... *G09G 3/3406* (2013.01); *G09G 2320/0626* (2013.01); *G09G 2340/0435* (2013.01)

(58) Field of Classification Search
CPC ......... G09G 2320/0626; G09G 3/3406; G09G 2330/021
See application file for complete search history.

(56) References Cited

U.S. PATENT DOCUMENTS 5,844,540 A 12/1998 Terasaki
11,303,842 B2 * 4/2022 Zhou .................... H05B 45/347
(Continued)

FOREIGN PATENT DOCUMENTS

CN 103606356 A 2/2014
CN 104252831 A 12/2014
(Continued)

OTHER PUBLICATIONS

First Office Action issued in counterpart Chinese Patent Application No. 202111389985.8, dated Jul. 1, 2022.
(Continued)

*Primary Examiner* — Van N Chow
(74) *Attorney, Agent, or Firm* — Westbridge IP LLC

(57) ABSTRACT

Disclosed are a local dimming drive circuit, a local dimming drive method, a local dimming drive system and an electronic equipment. The local dimming drive circuit includes: a dimming control circuit and a constant current drive circuit; the input end of the dimming control circuit is connected to the mainboard, and the output end of the dimming control circuit is connected to the input end of the constant current drive circuit, and the output end of the constant current drive circuit is connected to the backlight panel; the mainboard is configured to provide the first backlight brightness data and the first vertical synchronization signal; the dimming control circuit is configured to obtain the second backlight brightness data according to the
(Continued)

first backlight brightness data, and output the second backlight brightness data at the refresh rate of the first vertical synchronization signal.

19 Claims, 5 Drawing Sheets

(56) References Cited

U.S. PATENT DOCUMENTS

| | | | | |
|---|---|---|---|---|
| 2012/0139968 | A1 | 6/2012 | Adachi | |
| 2020/0279534 | A1 | 9/2020 | Ji et al. | |
| 2022/0322511 | A1* | 10/2022 | Zhang | G09G 3/3406 |
| 2023/0266162 | A1* | 8/2023 | Fu | G01J 1/4204 |
| 2023/0298539 | A1* | 9/2023 | Wang | G09G 3/32<br>345/520 |

FOREIGN PATENT DOCUMENTS

| | | | |
|---|---|---|---|
| CN | 104332140 | A | 2/2015 |
| CN | 105374329 | A | 3/2016 |
| CN | 105390096 | A | 3/2016 |
| CN | 206864163 | U | 1/2018 |
| CN | 108231014 | A | 6/2018 |
| CN | 109166532 | A | 1/2019 |
| CN | 214099114 | U | 8/2021 |
| JP | 2008139429 | A | 6/2008 |
| KR | 20080037982 | A | 5/2008 |
| TW | I757000 | B | 3/2022 |

OTHER PUBLICATIONS

International Search Report and Written Opinion issued in corresponding PCT Application No. PCT/CN2021/142091, dated Aug. 17, 2022.

Notification to Grant Patent Right for Invention issued in counterpart Chinese Patent Application No. 202111389985.8, dated Feb. 26, 2023.

* cited by examiner

LOCAL DIMMING DRIVE CIRCUIT, METHOD, SYSTEM AND ELECTRONIC EQUIPMENT

CROSS-REFERENCE TO RELATED APPLICATIONS

This application is a continuation application of International Application No. PCT/CN2021/142091, filed on Dec. 28, 2021, which claims priority to Chinese Patent Application No. 202111389985.8, filed on Nov. 22, 2021. The disclosures of the above-mentioned applications are incorporated herein by reference in their entireties.

TECHNICAL FIELD

The present application relates to the field of display driving, and in particular to a local dimming drive circuit, a local dimming drive method, a local dimming drive system and an electronic equipment.

BACKGROUND

Variable Refresh Rate (VRR) technology can effectively improve the display effect of the display panel. The conventional refresh rate of the display screen is 50 Hz, 60 Hz, 100 Hz or 120 Hz. To ensure that the screen and backlight are synchronized, the refresh rate of the backlight brightness (that is, the current driven by the constant current) needs to be synchronized with the screen refresh rate of the mainboard display screen, so as to meet the needs of high dynamic contrast and high dynamic range images.

Currently, a common constant current driving solution is to achieve frequency matching of different vertical synchronization signals by adjusting the register configuration parameters related to the driving current in the backlight source drive circuit. Although this method can achieve compatibility with the frequencies of different vertical synchronization signals, for frequent switching of the frequencies of different vertical synchronization signals, it is necessary to adjust the configuration parameters in the backlight source drive circuit frequently, the adjustment process will cause jitter phenomenon in the backlight current, which may easily cause stroboscopic phenomenon, thereby affecting the screen display effect.

SUMMARY

The main purpose of the present application is to provide a local dimming drive circuit, a local dimming drive method, a local dimming drive system and an electronic equipment, aiming to solve the problem that the display panel strobes when switching the frequency of the vertical synchronization signal.

In order to achieve the above purpose, the present application provides a local dimming drive circuit configured to drive a backlight panel to work according to control of a mainboard, and the mainboard is configured to provide first backlight brightness data and a first vertical synchronization signal; the local dimming drive circuit includes:

a dimming control circuit, where an input end of the dimming control circuit is connected to the mainboard, the dimming control circuit is configured to process the first backlight brightness data to obtain second backlight brightness data and output the second backlight brightness data at a refresh rate of the first vertical synchronization signal, the dimming control circuit is further configured to output second vertical synchronization signal, and a refresh rate of the second vertical synchronization signal is a preset value greater than the refresh rate of the first vertical synchronization signal; and a constant current drive circuit, where an input end of the constant current drive circuit is connected to an output end of the dimming control circuit, an output end of the constant current drive circuit is connected to the backlight panel, and the constant current drive circuit is configured to drive the backlight panel to display according to the second backlight brightness data when receiving the second vertical synchronization signal.

In an embodiment, the dimming control circuit includes a control unit, a first input end of the control unit is connected to the mainboard to receive the first backlight brightness data, a second input end of the control unit is also connected to the mainboard to receive the first vertical synchronization signal, and an output end of the control unit is the output end of the dimming control circuit; and the control unit is configured to process the first backlight brightness data to obtain the second backlight brightness data, and output the second backlight brightness data when receiving the first vertical synchronization signal; and the control unit is further configured to output the second vertical synchronization signal.

In an embodiment, the control unit is provided with a data port, and the data port is the first input end of the control unit; and the control unit is further configured to reset the data port after outputting the second backlight brightness data.

In an embodiment, the constant current drive circuit includes a constant current drive chip, a first input end of the constant current drive chip is connected to the dimming control circuit to receive the second backlight brightness data, a second input end of the constant current driver chip is also connected to the dimming control circuit to receive the second vertical synchronization signal, and an output end of the constant current drive chip is the output end of the constant current drive circuit; and the constant current driver chip is configured to output the second backlight brightness data to drive the backlight panel to refresh when receiving the second vertical synchronization signal.

In an embodiment, the refresh rate of the second vertical synchronization signal is greater than twice the refresh rate of the first vertical synchronization signal.

In an embodiment, the processing the first backlight brightness data to obtain the second backlight brightness data includes:

verifying whether the first backlight brightness data is correct; and if the first backlight brightness data is correct, using the first backlight brightness data as the second backlight brightness data.

In addition, in order to achieve the above purpose, the present application further provides a local dimming drive method applied to the local dimming drive circuit as described above, comprising:

receiving the first backlight brightness data and the first vertical synchronization signal output by the mainboard, and processing the first backlight brightness data to obtain the second backlight brightness data; and outputting the second backlight brightness data to the constant current drive circuit at the refresh rate of the first vertical synchronization signal, so that the constant current drive circuit drives the backlight panel to display according to the second backlight brightness data at the refresh rate of the second vertical synchronization signal; where the refresh rate of the second vertical synchronization signal is a preset value greater than the refresh rate of the first vertical synchronization signal.

In addition, in order to achieve the above purpose, the present application further provides a local dimming drive system, including a mainboard, a backlight panel, and a local dimming drive circuit, the local dimming drive circuit is configured as a local dimming drive circuit as described above, the input end of the dimming control circuit is connected to the mainboard, and the output end of the constant current drive circuit is connected to the backlight panel.

In an embodiment, the mainboard includes an on-chip control system and a liquid crystal module controller, and the on-chip control system is respectively connected to the input end of the dimming control circuit and the liquid crystal module controller;

the on-chip control system is configured to provide the first backlight brightness data and the first vertical synchronization signal to the dimming control circuit; and the on-chip control system is further configured to provide an image signal to the liquid crystal module controller at the refresh rate of the first vertical synchronization signal to control a liquid crystal panel to perform synchronous refresh.

In addition, in order to achieve the above purpose, the present application further provides an electronic equipment including a local dimming drive circuit and a backlight panel, the local dimming drive circuit is configured as the local dimming drive circuit as described above, and the output end of the constant current drive circuit is connected to the backlight panel.

The present application uses the dimming control circuit to output the second vertical synchronization signal to the constant current drive circuit at a fixed refresh rate to drive the backlight panel to refresh at a fixed refresh rate, so there is no need to adjust relevant parameters in the constant current drive circuit, thus avoiding the picture strobing caused by the jitter in the output backlight current when adjusting the relevant parameters in the constant current drive circuit, that is, solving the problem of strobes appearing on the display panel when the frequency of the vertical synchronization signal is switched. Moreover, the constant current drive circuit updates the current backlight brightness data according to the refresh rate of the first vertical synchronization signal and refreshes the backlight panel according to the refresh rate of the second vertical synchronization signal, the refresh rate of the second vertical synchronization signal is greater than the refresh rate of the first vertical synchronization signal, thus ensuring that before the current backlight brightness data is updated, the backlight panel has been refreshed at least once based on the current backlight brightness data, thus ensuring that the backlight brightness data will not be lost, thereby making the display effect of the display panel more stable.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those of ordinary skill in the art.

Figure 1:
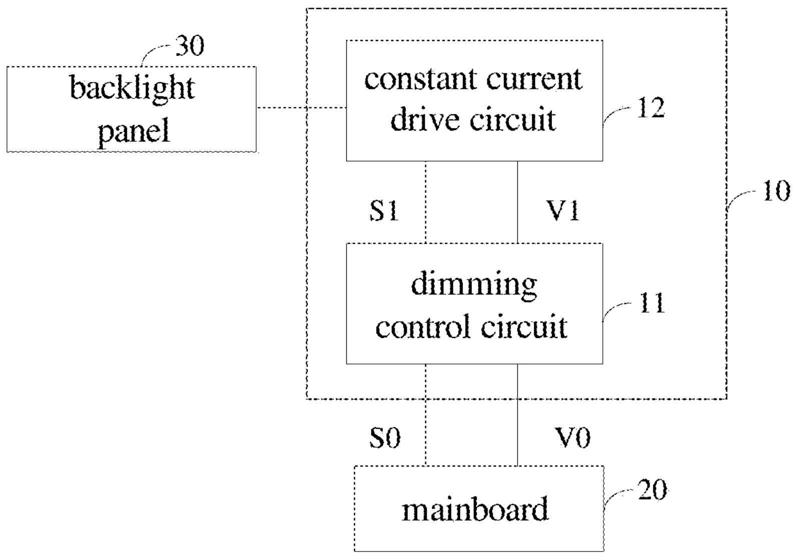
FIG. 1 is a functional module schematic view of a local dimming drive circuit according to an embodiment of the present application.

The realization of the purpose, functional features and advantages of the present application will be further described in conjunction with the embodiments and with reference to the accompanying drawings.

DETAILED DESCRIPTION OF THE EMBODIMENTS

It should be understood that the specific embodiments described here are only used to explain the present application and are not used to limit the present application.

The technical solutions in the embodiments according to the present application will be clearly and completely described below in conjunction with the accompanying drawings in the embodiments according to the present application, and it is clear that the described embodiments are only a part of the embodiments according to the present application, and not all of the embodiments. Based on the embodiments in the present application, all other embodiments obtained by those of ordinary skill in the art without making creative labor fall within the scope of the present application.

It should be noted that in the embodiment of the present application, all directional indications (such as up, down, left, right, front, back or the like) are only used to explain the relative positional relationship, movement and so on between various components in a specific posture (as shown in the accompanying drawings). If the specific posture changes, the directional indication will also change accordingly.

In addition, if there are descriptions involving “first”, “second” or the like, the descriptions of “first”, “second” or the like are only for descriptive purposes and cannot be understood as indicating or implying the relative importance or implicitly indicating the quantity of the technical features indicated. Therefore, features defined as “first” and “second” may explicitly or implicitly include at least one of these features. In addition, the technical solutions of various embodiments can be combined with each other, but it is based on that those of ordinary skill in the art can realize. When the combination of technical solutions is contradictory or cannot be realized, it should be considered that such combination of technical solutions does not exist and is not within the protection scope claimed by the present application.

It is understandable that all images on the monitor are scanned line by line, whether it is interlaced scanning or progressive scanning, there are two synchronization parameters: horizontal synchronization and vertical synchronization. The horizontal synchronization signal determines the time for the display panel to draw a line across the screen, and the vertical synchronization signal determines the time for the display panel to draw a line from the top to the bottom and then return to the original position. The vertical synchronization signal represents the refresh rate level of the display panel.

The refresh rate refers to the number of times the electron beam scans the image on the screen repeatedly. The higher the refresh rate, the better the stability of the displayed image (picture). Refresh rate is divided into vertical refresh rate and horizontal refresh rate, and the generally mentioned refresh rate usually refers to the vertical refresh rate. The vertical refresh rate indicates how many times the screen's image is redrawn per second, that is, the number of screen refreshes per second, in Hz (Hertz). The higher the refresh rate, the better, the more stable the image, the more natural and clearer the image display, and the less impact on the eyes. The lower the refresh rate, the more flickering and jittering the figure will be, and the faster the eyes will tire.

When the screen is refreshed, the backlight brightness and display screen are refreshed separately. The specific process is refreshed as follows: the mainboard outputs the vertical synchronization signal VSYNC (Vertical Synchronization), backlight brightness data (that is, the current that drives the constant current drive of the backlight panel), low-voltage differential signal (picture signal), audio signal and other signals; after the backlight source drive circuit receives the vertical synchronization signal and backlight brightness data, driving the backlight source panel to refresh the backlight brightness according to the frequency of the vertical synchronization signal, so as to ensure that the brightness refresh rate of the backlight panel is synchronized with the control signal of the mainboard.

However, a common constant current driving solution is to achieve frequency matching of different vertical synchronization signals output by the mainboard by adjusting the register configuration parameters related to the driving current in the backlight source drive circuit. Although this method can achieve compatibility with the frequencies of different vertical synchronization signals, for frequent switching of the frequencies of different vertical synchronization signals, it is necessary to frequently adjust the configuration parameters in the backlight source drive circuit, the adjustment process will cause jitter phenomenon in the backlight current, which may easily cause stroboscopic phenomenon, thereby affecting the screen display effect.

In response to the above problems, the present application provides a local dimming drive circuit, referring to FIG. 1, in an embodiment, the local dimming drive circuit 10 is configured to drive a backlight panel 30 to work according to control of a mainboard 20, the mainboard 20 is configured to provide first backlight brightness data S0 and a first vertical synchronization signal V0, and the local dimming drive circuit 10 includes a dimming control circuit 11 and a constant current drive circuit 12.

An input end of the dimming control circuit 11 is connected to the mainboard 20 to receive the backlight brightness data S0 and the first vertical synchronization signal V0, the dimming control circuit 11 is configured to process the first backlight brightness data S0 to obtain second backlight brightness data S1 and output the second backlight brightness data S1 at a refresh rate of the first vertical synchronization signal V0, the dimming control circuit 11 is further configured to output second vertical synchronization signal V1, and a refresh rate of the second vertical synchronization signal V1 is a preset value greater than the refresh rate of the first vertical synchronization signal V0.

An input end of the constant current drive circuit 12 is connected to an output end of the dimming control circuit 11 to receive the second backlight brightness data S1 and the second vertical synchronization signal V1, an output end of the constant current drive circuit 12 is connected to the backlight panel 12, and the constant current drive circuit 12 is configured to drive the backlight panel 30 to display according to the second backlight brightness data S1 when receiving the second vertical synchronization signal V1.

It is understandable that the adjustment methods of the backlight brightness are generally divided into two types: global dimming and local dimming. The local dimming method can realize the independent adjustment of the brightness of each area in the backlight according to the number of partitions of the LED lights. Compared with the global dimming method, the local dimming method can effectively reduce the backlight power consumption and achieve the purpose of energy saving and emission reduction. Furthermore, the local dimming method can greatly improve the contrast of display products and improve the quality of the screen display.

The local dimming drive circuit 10 can be provided in various electronic equipment that need to be connected to the mainboard 20 to control and drive the backlight panel 30 for display. For example, the electronic device can be liquid crystal panel, monitor, TV, computer and other products. The above-mentioned backlight panel 30 may include an LED light bar.

The dimming control circuit 11 may include a control circuit composed of logic control chips such as Micro Control Unit (MCU) and so on, the constant current drive circuit 12 can use a constant current drive chip, and the above-mentioned local dimming drive circuit 10 may further include a current sampling circuit and a Direct Current-Direct Current conversion circuit, which are not limited here.

The first backlight brightness data S0 is data corresponding to brightness output by the mainboard 20 that the backlight panel 30 should display in a corresponding period, specifically, it can be a Local Dimming Serial Peripheral Interface signal (Local Dimming SPI signal), it can come from Field-Programmable Gate Array (FPGA), System on Chip (SOC) or Timing Controller (TCON) board, and it needs to be provided according to the actual circuit specifically.

The dimming control circuit 11 receives the first backlight brightness data S0 and then processes it, for example, verifying the first backlight brightness data S0. If the verification is correct, the format of the data will be converted and processed, and the second backlight brightness data S1 suitable for the constant current drive chip will be output, so that the constant current drive circuit 12 outputs a corresponding drive current and drives the backlight panel 30 to display a corresponding brightness.

It should be noted that in the actual circuit, the refresh rate of the first vertical synchronization signal V0 is a variable frequency, which is specifically changed and output according to the control of the mainboard 20. However, the refresh rate of the first vertical synchronization signal V0 changes within a foreseeable change interval, therefore, in this embodiment, the preset value of the refresh rate of the second vertical synchronization signal is set to a fixed value greater than the maximum value of the change interval of the refresh rate of the first vertical synchronization signal.

The mainboard 20 outputs the first vertical synchronization signal V0 and the first backlight brightness data S0 at the same refresh rate; after the dimming control circuit 11 receives the first vertical synchronization signal V0, outputting the second backlight brightness data S1 to the constant current drive circuit 12, and outputting the second vertical synchronization signal V1. After the constant current drive circuit 12 receives the second backlight brightness data S1, the constant current drive circuit 12 saves the second backlight brightness data S1 into the register, so that the current backlight data is updated to the second backlight brightness data S1, and when receiving the second vertical synchronization signal V1, driving the backlight panel 30 to display according to the second backlight brightness data S1.

Figure 2:
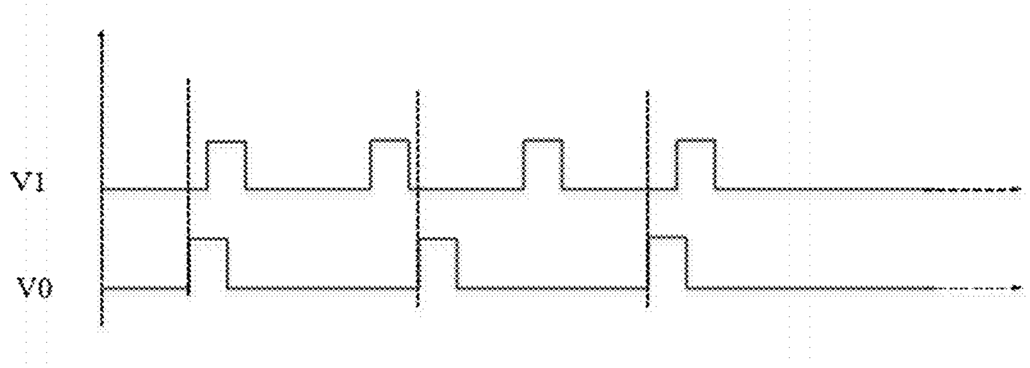
FIG. 2 is a waveform schematic view of a first vertical synchronization signal and a second vertical synchronization signal of the local dimming drive circuit according to an embodiment of the present application.

Referring to FIG. 2, since the refresh rate of the second vertical synchronization signal V1 is greater than the refresh rate of the first vertical synchronization signal V0, that is to say, the refresh rate of the backlight brightness of the constant current drive circuit 12 is greater than the data update frequency, then in a single V0 cycle, the constant current drive circuit 12 completes at least one backlight brightness refresh, thereby ensuring good frame refresh the backlight brightness data. Certainly, if the backlight brightness data of the same frame is refreshed multiple times, the actual backlight brightness will not change because the backlight brightness data has not changed.

Figure 3:
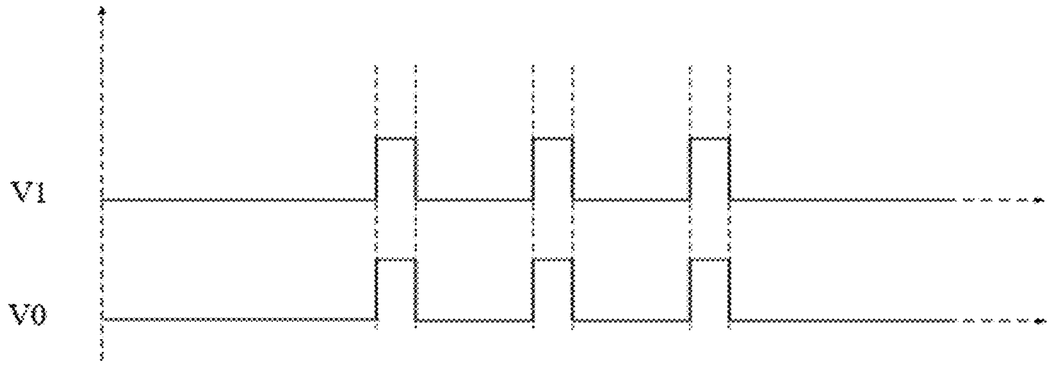
FIG. 3 is a waveform schematic view of a first vertical synchronization signal and a second vertical synchronization signal in the existing local dimming drive circuit.

Referring to FIG. 3, in the existing local dimming drive circuit, in order to achieve synchronous refresh of the backlight brightness, it is necessary to synchronize the frequency of the second vertical synchronization signal V1 with the first vertical synchronization signal V0. The MCU receives and outputs data according to the first vertical synchronization signal V0, the backlight brightness data only undergoes format conversion and is output to the constant current drive chip synchronously with the second vertical synchronization signal V1. After the constant current drive chip receives the second vertical synchronization signal V1, the constant current drive chip refreshes the backlight panel according to the backlight brightness data. In order to match the frequency of the output second vertical synchronization signal V1 with the frequency of the variable first vertical synchronization signal V0, the MCU is required to dynamically adjust the relevant register configuration of the constant current drive chip according to the frequency of the first vertical synchronization signal V0. The adjustment process will produce jitter in the output backlight drive current, especially the situation where the frequency of the first vertical synchronization signal V0 changes frequently, and obvious stroboscopic phenomenon will appear on the display panel.

In this embodiment, since the frequency of the second vertical synchronization signal V1 is provided to be a fixed value, the backlight brightness data received by the constant current drive circuit 12 can be refreshed at a fixed frequency, the parameters of the relevant registers no longer need to be adjusted, thereby avoiding the jitter in the output backlight current caused by parameter adjustment, and solving the problem of stroboscopic on the display panel when the frequency of the vertical synchronization signal is switched.

In this embodiment, by refreshing the brightness data received by the dimming control circuit 11 at a fixed frequency, the refresh rate used by the constant current drive circuit 12 is separated from the refresh rate of the mainboard display screen picture, that is, the second vertical synchronization signal V1 and the first vertical synchronization signal V0 are independent and not related to each other, but at the same time, it meets the requirement that the refresh rate of the backlight circuit data (current driven by constant current) needs to be synchronized with the refresh rate of the mainboard display screen. Although the frequency of the first vertical synchronization signal V0 can be changed, however, processing by the software algorithm of the dimming control circuit 11, the backlight brightness refresh can be completed within one first vertical synchronization signal V0 cycle, at the same time, it ensures that there is no sudden change in the backlight current and realizes smooth switching of pictures, thus providing a strong guarantee for the presentation of high dynamic contrast image quality, bringing users a more brilliant and realistic picture quality experience, and empowering products such as TVs and monitors.

Figure 4:
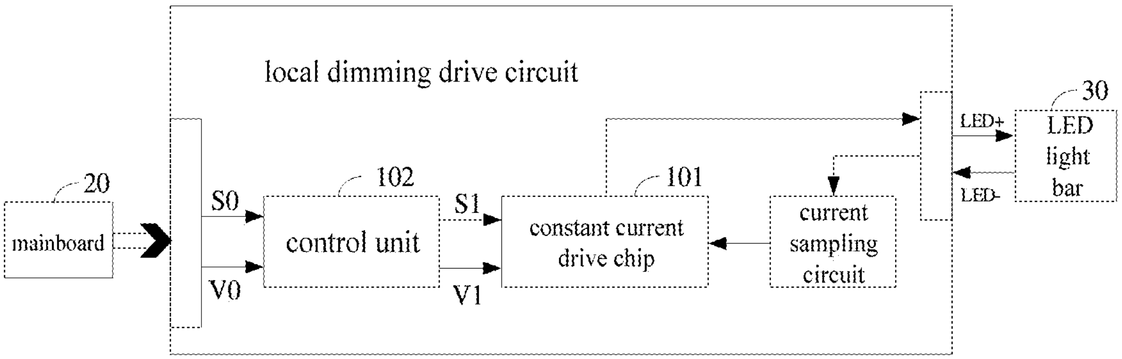
FIG. 4 is a module schematic view of a local dimming drive circuit according to another embodiment of the present application.

Furthermore, referring to FIG. 4, the dimming control circuit 11 includes a control unit 102, a first input end of the control unit 102 is connected to the mainboard 20 to receive the first backlight brightness data S0, a second input end of the control unit 102 is also connected to the mainboard to receive the first vertical synchronization signal V0, and an output end of the control unit 102 is the output end of the dimming control circuit 11 and is connected to the constant current drive circuit 12; and the control unit 102 is configured to process the first backlight brightness data S0 to obtain the second backlight brightness data S1, and output the second backlight brightness data S1 when receiving the first vertical synchronization signal V0; and the control unit 102 is further configured to output the second vertical synchronization signal S1.

The input end of the dimming control circuit 11 includes a first input end of the control unit 102 and a second input end of the control unit 102.

In this embodiment, the control unit 102 can select an MCU, and those skilled in the art can refer to common techniques in the art for setting and only need to implement the above corresponding functions. The first input end of the control unit 102, the second input end of the control unit 102 and the output end of the control unit 102 can be specifically provided according to the selected chip without limitation.

Specifically, the processing the first backlight brightness data S0 to obtain the second backlight brightness S1 data includes:

verifying whether the first backlight brightness data S0 is correct; and in response to that the first backlight brightness data S0 is correct, using the first backlight brightness data S0 as the second backlight brightness data S1.

It is understandable that the first backlight brightness data S0 is continuously updated along with the first vertical synchronization signal V0, and each time a first vertical synchronization signal V0 is received, it is updated once. Each time the control unit 102 receives one first backlight brightness data S0, the control unit 102 needs to verify the first backlight brightness data S0 once, if the verification is correct, the first backlight brightness data S0 will be output as the second backlight brightness data S1; if the verification is incorrect, it can be determined that the first backlight brightness data is incorrect, then it is necessary to output the last correctly verified first backlight brightness data S0 as the second backlight brightness data S1, so that the backlight panel maintains the brightness of the previous frame. There are many reasons for errors in the first backlight brightness data, for example, the mainboard has occasional abnormal timing or data, and the mainboard is interfered by other signals when sending data, etc. If incorrect backlight brightness data is sent to the constant current drive circuit 12 to drive the backlight panel 30, it is likely to cause abnormal phenomena such as dark blocks, dark bars, flickering or the like in the backlight panel 30. In this embodiment, the control unit 102 verifies the received backlight data and blocks abnormal data with incorrect verification, thereby ensuring that the output data configured to drive the backlight panel is valid, and avoiding that the backlight panel 30 is abnormal because of this.

The verifying whether the first backlight brightness data S0 is correct includes:

- performing a verification operation on data bits in the first backlight brightness data S0 by a preset verification algorithm to obtain verification data;
- comparing whether the verification data matches verification bit data in the first backlight brightness data S0; and
- in response to that the verification data matches verification bit data in the first backlight brightness data S0, the first backlight brightness data is correct.

The match can be equality or satisfy some pre-agreed relationship. It is understandable that the first backlight brightness data is one frame of data, then a certain bit of data or a certain number of bits of data can be configured as a verification bit, and the other bits can be configured as data bit, and calculating whether the data bit match the verification bit by the preset verification algorithm.

Furthermore, the control unit 102 is provided with a data port (not shown), and the data port is the first input end of the control unit 102 and is configured to receive the first backlight brightness data S0; and the control unit 102 is further configured to reset the data port after outputting the second backlight brightness data S1.

In this embodiment, the data port may be a serial peripheral interface (SPI) of the MCU or other data interfaces. Taking the data port as an SPI port as an example, if the mainboard occasionally encounters abnormal timing or data, it will cause the MCU to continuously receive incorrect data, the SPI port will also write wrong potentials, thus causing the reception of the next frame of data to be abnormal. Therefore, before receiving the next frame of data, resetting the SPI port can ensure that the MCU can receive data normally according to the frame, and avoid abnormal data causing abnormal display of the backlight panel.

The constant current drive circuit 12 includes a constant current drive chip 102, a first input end of the constant current drive chip 101 is connected to the dimming control circuit to receive the second backlight brightness data S2, a second input end of the constant current driver chip 101 is also connected to the dimming control circuit to receive the second vertical synchronization signal V1, and an output end of the constant current drive chip 101 is the output end of the constant current drive circuit 12 connected to the backlight panel 30; and the constant current driver chip 101 is configured to output the second backlight brightness data S2 to drive the backlight panel 30 to refresh when receiving the second vertical synchronization signal V1.

In this embodiment, the constant current drive chip 101 includes a relevant register for outputting a drive current according to the received vertical synchronization signal, which is programmed by the dimming control circuit 11. Since the second vertical synchronization signal V1 is a fixed value, there is no need to frequently adjust the parameters of this register, thereby avoiding problems such as screen flickering caused by this. The first input end of the constant current drive chip 101 and the second input end of the constant current drive chip 101 are the input end of the constant current drive circuit 12 respectively. The specific pins of the first input end of the constant current drive chip 101, the second input end of the constant current drive chip 101 and the output end of the constant current drive chip 101 can be configured according to the specific selected chip.

In this embodiment, the interior of the constant current drive chip 101 integrates a Direct Current-Direct Current conversion circuit. Certainly, a drive chip without an integrated Direct Current-Direct Current conversion circuit can also be selected. Correspondingly, the local dimming drive circuit 10 further needs to include a Direct Current-Direct Current conversion circuit, and the constant current drive chip 101 controls the Direct Current-Direct Current conversion circuit to drive the backlight panel 30.

The local dimming drive circuit 10 may further include a current sampling circuit, which may be provided according to the actual circuit specifically.

Furthermore, the refresh rate of the second vertical synchronization signal V1 is greater than twice the refresh rate of the first vertical synchronization signal V0.

In this embodiment, the refresh rate of the second vertical synchronization signal V1 is provided to be twice the refresh rate of the first vertical synchronization signal V0. Furthermore, it is ensured that the MCU implements brightness refresh at least once within the period of the first vertical synchronization signal V0.

Figure 5:
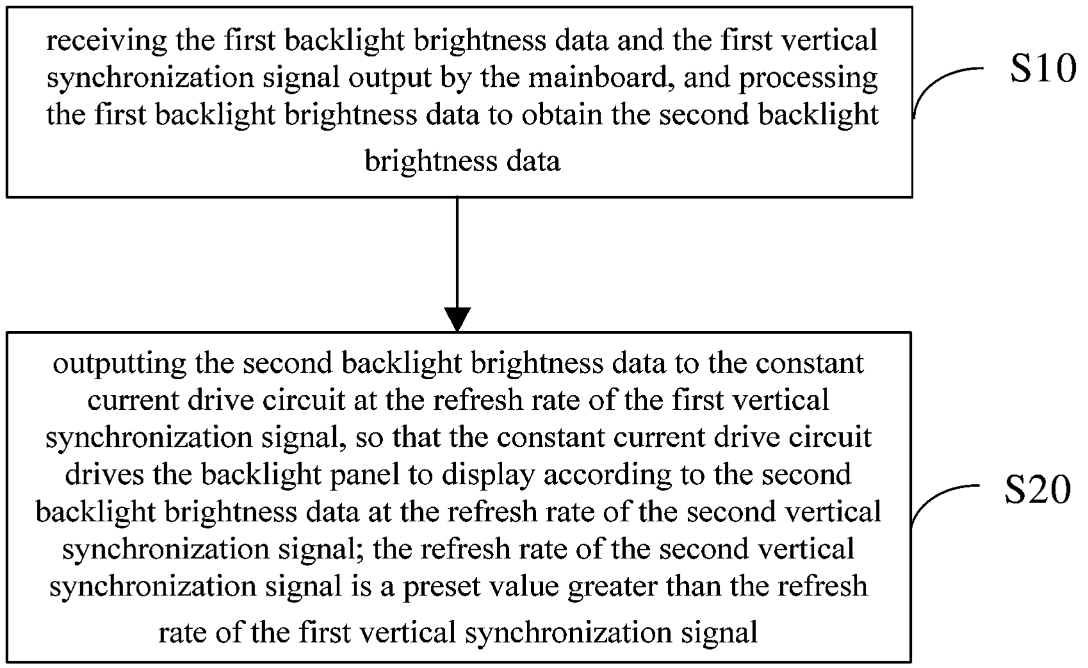
FIG. 5 is a schematic flow chart of a local dimming drive method according to an embodiment of the present application.

The present application provides a local dimming drive method, referring to FIG. 5, in an embodiment, the local dimming drive method includes:

Step S10, receiving the first backlight brightness data and the first vertical synchronization signal output by the mainboard, and processing the first backlight brightness data to obtain the second backlight brightness data.

Step S20, outputting the second backlight brightness data to the constant current drive circuit at the refresh rate of the first vertical synchronization signal, so that the constant current drive circuit drives the backlight panel to display according to the second backlight brightness data at the refresh rate of the second vertical synchronization signal; the refresh rate of the second vertical synchronization signal is a preset value greater than the refresh rate of the first vertical synchronization signal.

The local dimming drive method can be applied to the local dimming drive circuit in any of the above embodiments, or to local dimming circuits with other structures. The execution subject of this method is a dimming control circuit.

In this embodiment, by configuring the dimming control circuit to output the second backlight brightness data at a fixed refresh rate, there is no need to adjust relevant parameters in the constant current drive circuit, thus avoiding the picture strobing caused by the jitter in the output backlight current when adjusting the relevant parameters in the constant current drive circuit, that is, solving the problem of strobes appearing on the display panel when the frequency of the vertical synchronization signal is switched. Moreover, the constant current drive circuit updates the current backlight brightness data according to the refresh rate of the first vertical synchronization signal and refreshes the backlight panel according to the refresh rate of the second vertical synchronization signal, the refresh rate of the second vertical synchronization signal is greater than the refresh rate of the first vertical synchronization signal, thus ensuring that before the current backlight brightness data is updated, the backlight panel has been refreshed at least once based on the current backlight brightness data, thus ensuring that the backlight brightness data will not be lost, thereby making the display effect of the display panel more stable, and providing a strong guarantee for the presentation of high dynamic contrast image quality.

Furthermore, the refresh rate of the second vertical synchronization signal is greater than twice the refresh rate of the first vertical synchronization signal, thereby ensuring that the constant current drive circuit realizes at least one brightness refresh within one period of a first vertical synchronization signal, so that the brightness refresh data is not lost.

Figure 6:
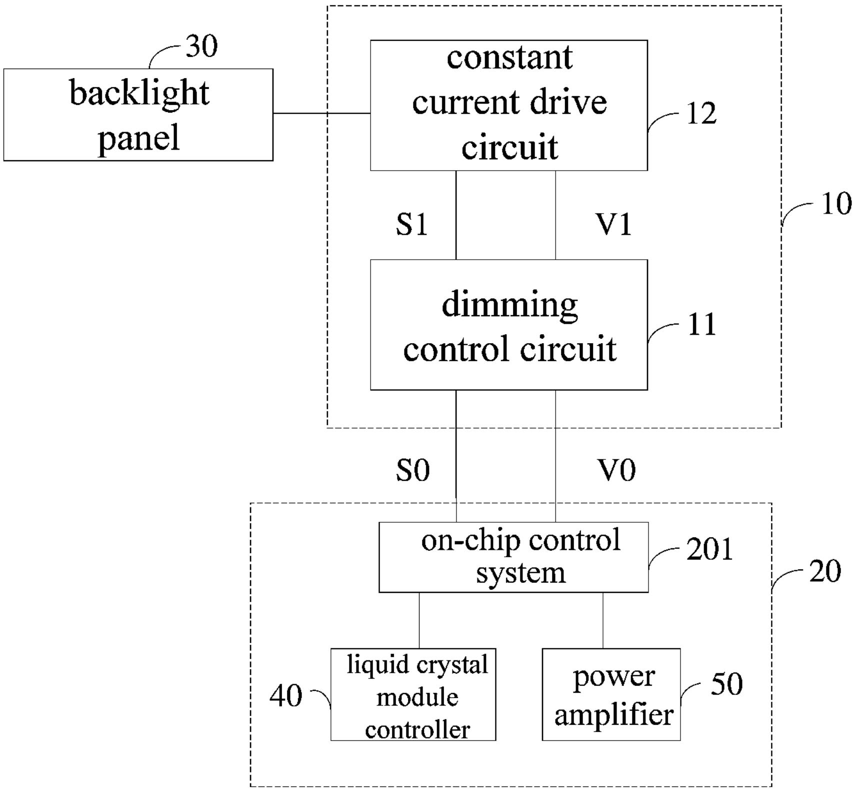
FIG. 6 is a module schematic view of a local dimming drive system according to an embodiment of the present application.

The present application provides a local dimming drive system, referring to FIG. 6, in an embodiment, the local dimming drive system includes a mainboard 20, a backlight panel 30, and a local dimming drive circuit 10, the structure of the local dimming drive circuit 10 can be referred to the local dimming drive circuit 10 in the above embodiment and will not be described again here, the input end of the dimming control circuit 11 is connected to the mainboard 20, and the output end of the constant current drive circuit 12 is connected to the backlight panel 30.

Since the local dimming drive system of this embodiment adopts the above-mentioned technical solution of the local dimming drive circuit 10, as a matter of course, this local dimming drive system has all the beneficial effects of the above-mentioned local dimming drive circuit 10.

Furthermore, the mainboard 20 includes an on-chip control system 201 and a liquid crystal module controller 40, and the on-chip control system 201 is respectively connected to the input end of the dimming control circuit 11 and the liquid crystal module controller 40.

The on-chip control system 201 is configured to provide the first backlight brightness data and the first vertical synchronization signal to the dimming control circuit 11.

The on-chip control system 201 is further configured to provide an image signal to the liquid crystal module controller at the refresh rate of the first vertical synchronization signal to control a liquid crystal panel to perform synchronous refresh.

In this embodiment, since the on-chip control system 201 outputs the first backlight brightness data, the first vertical synchronization signal and the image signal with synchronous signals, it can ensure that the screen display refresh of the liquid crystal panel and the backlight brightness refresh of the backlight panel are synchronized, the switching effect of the screen display is smoother, and the high dynamic contrast image quality is higher.

Furthermore, the mainboard 20 further includes a power amplifier 50, and the power amplifier 50 is connected to the on-chip control system SOC; and the on-chip control system SOC is further configured to output an audio signal to the power amplifier 50 so that the power amplifier 50 plays audio synchronously.

In this embodiment, the on-chip control system SOC can output the first backlight brightness data, the first vertical synchronization signal, the image signal and the audio signal with synchronous signals, which can ensure that the screen display refresh of the liquid crystal panel, the backlight brightness refresh of the backlight panel and the audio signal played by the power amplifier are synchronized, thereby bringing users a high-quality experience with more gorgeous pictures and realistic sound effects.

Figure 7:
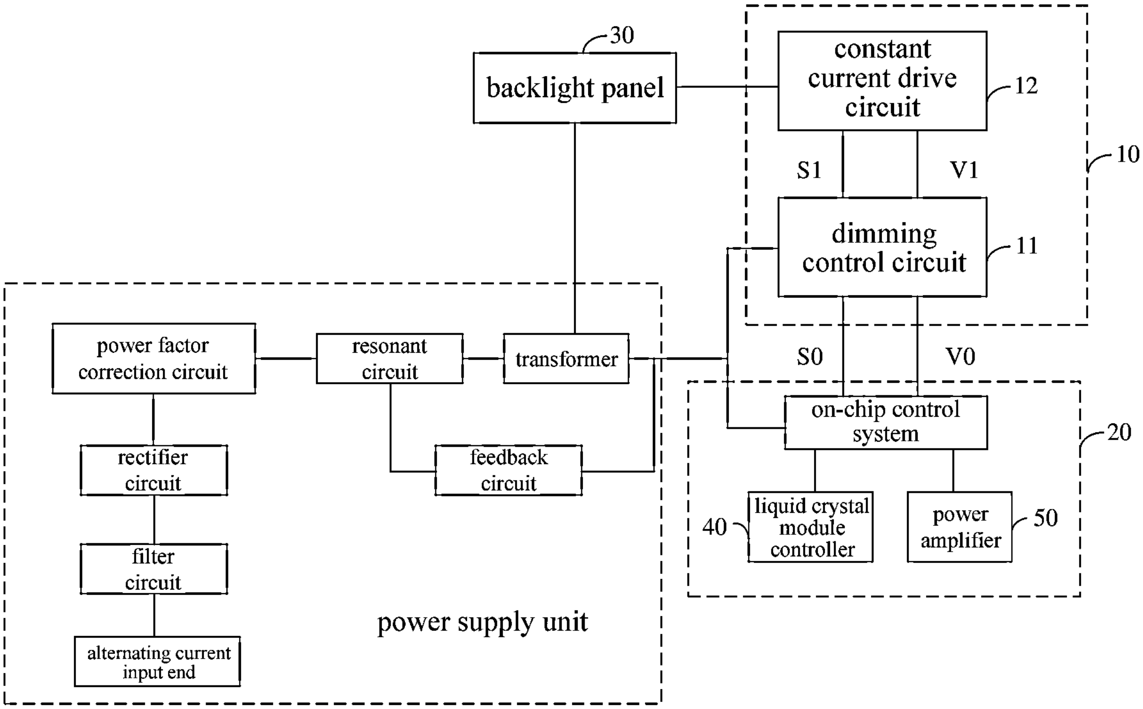
FIG. 7 is a module schematic view of a local dimming drive system according to another embodiment of the present application.

It should be noted that, referring to FIG. 7, the above-mentioned local dimming drive system may further include a power supply unit Power Supply Unit (PSU), and the power supply unit is configured to convert an alternating current power supply into power supplies respectively suitable for the backlight panel 30, the mainboard 20 and the local dimming drive circuit 10 to provide power for each circuit separately. Specifically, the power supply unit may include a filter circuit (such as an EMI filter circuit), a rectifier circuit, a power factor correction circuit, a resonant circuit (such as a LLC resonant circuit), a transformer and a feedback circuit to make the output power supply voltage more stable.

The present application provides an electronic equipment, in an embodiment, the electronic equipment includes a local dimming drive circuit and a backlight panel, the structure of the local dimming drive circuit can refer to the above embodiment and will not be described in detail here, and the output end of the constant current drive circuit is connected to the backlight panel. As a matter of course, since the electronic equipment according to this embodiment adopts the technical solution of the constant current drive circuit mentioned above, the electronic equipment has all the beneficial effects of the above constant current drive circuit.

It should be noted that, in the present application, the terms “comprise”, “include” or any other variation thereof are intended to cover a non-exclusive inclusion, such that a process, method, article or system that includes a list of elements not only includes those elements, but also includes other elements not expressly listed, or also includes elements inherent to the process, method, article or system. In a case of without further restrictions, an element defined by the statement “includes a . . . ” does not exclude the existence of other identical elements in a process, method, article or system that includes this element.

The above serial numbers of the embodiments of the present application are only for description and do not represent the advantages and disadvantages of the embodiments.

The above are only some embodiments of the present application, and do not limit the scope of the present application. Any equivalent structure or equivalent process transformation made by using the description and accompanying drawings of the present application, or directly or indirectly applied in other related technical fields, are all equally included within the scope of the present application.

What is claimed is:

1. A local dimming drive circuit configured to drive a backlight panel to work according to control of a mainboard, the mainboard being configured to provide first backlight brightness data and a first vertical synchronization signal, wherein the local dimming drive circuit comprises:

a dimming control circuit, wherein an input end of the dimming control circuit is connected to the mainboard, the dimming control circuit is configured to process the first backlight brightness data to obtain second backlight brightness data and output the second backlight brightness data at a refresh rate of the first vertical synchronization signal, the dimming control circuit is further configured to output second vertical synchronization signal, and a refresh rate of the second vertical synchronization signal is a preset value greater than the refresh rate of the first vertical synchronization signal; and a constant current drive circuit, wherein an input end of the constant current drive circuit is connected to an output end of the dimming control circuit, an output end of the constant current drive circuit is connected to the backlight panel, and the constant current drive circuit is configured to drive the backlight panel to display according to the second backlight brightness data when receiving the second vertical synchronization signal;

wherein:

the dimming control circuit comprises a control unit, a first input end of the control unit is connected to the mainboard to receive the first backlight brightness data, a second input end of the control unit is also connected to the mainboard to receive the first vertical synchronization signal, and an output end of the control unit is the output end of the dimming control circuit; and the control unit is configured to process the first backlight brightness data to obtain the second backlight brightness data, and output the second backlight brightness data when receiving the first vertical synchronization signal; and the control unit is further configured to output the second vertical synchronization signal.

2. The local dimming drive circuit according to claim 1, wherein:

the control unit is provided with a data port, and the data port is the first input end of the control unit; and the control unit is further configured to reset the data port after outputting the second backlight brightness data.

3. The local dimming drive circuit according to claim 2, wherein the data port is a serial peripheral interface of a Micro Control Unit.

4. The local dimming drive circuit according to claim 1, wherein:

the constant current drive circuit comprises a constant current drive chip, a first input end of the constant current drive chip is connected to the dimming control circuit to receive the second backlight brightness data, a second input end of the constant current driver chip is also connected to the dimming control circuit to receive the second vertical synchronization signal, and an output end of the constant current drive chip is the output end of the constant current drive circuit; and the constant current driver chip is configured to output the second backlight brightness data to drive the backlight panel to refresh when receiving the second vertical synchronization signal.

5. The local dimming drive circuit according to claim 1, wherein the local dimming drive circuit is provided in an electronic device, and the electronic device is connected to the mainboard to control and drive the backlight panel for display.

6. The local dimming drive circuit according to claim 5, wherein the electronic device comprises at least one of a liquid crystal panel, a monitor, a television, and a computer.

7. The local dimming drive circuit according to claim 1, wherein the local dimming drive circuit further comprises a current sampling circuit and a Direct Current-Direct Current conversion circuit.

8. The local dimming drive circuit according to claim 1, wherein the first backlight brightness data is data corresponding to brightness output by the mainboard that the backlight panel displays in a corresponding period.

9. The local dimming drive circuit according to claim 8, wherein the data corresponding to brightness output by the mainboard that the backlight panel displays in the corresponding period is a Local Dimming Serial Peripheral Interface signal.

10. A local dimming drive circuit configured to drive a backlight panel to work according to control of a mainboard, the mainboard being configured to provide first backlight brightness data and a first vertical synchronization signal, wherein the local dimming drive circuit comprises:

a dimming control circuit, wherein an input end of the dimming control circuit is connected to the mainboard, the dimming control circuit is configured to process the first backlight brightness data to obtain second backlight brightness data and output the second backlight brightness data at a refresh rate of the first vertical synchronization signal, the dimming control circuit is further configured to output second vertical synchronization signal, and a refresh rate of the second vertical synchronization signal is a preset value greater than the refresh rate of the first vertical synchronization signal; and a constant current drive circuit, wherein an input end of the constant current drive circuit is connected to an output end of the dimming control circuit, an output end of the constant current drive circuit is connected to the backlight panel, and the constant current drive circuit is configured to drive the backlight panel to display according to the second backlight brightness data when receiving the second vertical synchronization signal;

wherein the refresh rate of the second vertical synchronization signal is greater than twice the refresh rate of the first vertical synchronization signal; and wherein a preset value of the refresh rate of the second vertical synchronization signal is a fixed value greater than a maximum value of a change interval of the refresh rate of the first vertical synchronization signal;

wherein:

the dimming control circuit comprises a control unit, a first input end of the control unit is connected to the mainboard to receive the first backlight brightness data, a second input end of the control unit is also connected to the mainboard to receive the first vertical synchronization signal, and an output end of the control unit is the output end of the dimming control circuit; and the control unit is configured to process the first backlight brightness data to obtain the second backlight brightness data, and output the second backlight brightness data when receiving the first vertical synchronization signal; and the control unit is further configured to output the second vertical synchronization signal.

11. A local dimming drive method applied to the local dimming drive circuit according to claim 1, comprising:

receiving the first backlight brightness data and the first vertical synchronization signal output by the mainboard, and processing the first backlight brightness data to obtain the second backlight brightness data; and outputting the second backlight brightness data to the constant current drive circuit at the refresh rate of the first vertical synchronization signal, so that the constant current drive circuit drives the backlight panel to display according to the second backlight brightness data at the refresh rate of the second vertical synchronization signal; wherein the refresh rate of the second vertical synchronization signal is a preset value greater than the refresh rate of the first vertical synchronization signal.

12. The local dimming drive method according to claim 11, wherein the processing the first backlight brightness data to obtain the second backlight brightness data comprises:

verifying whether the first backlight brightness data is correct; and in response to that the first backlight brightness data is correct, using the first backlight brightness data as the second backlight brightness data.

13. The local dimming drive method according to claim 11, wherein the processing the first backlight brightness data to obtain the second backlight brightness data comprises:

verifying whether the first backlight brightness data is correct; and in response to that the first backlight brightness data is incorrect, using a last correctly verified first backlight brightness data as the second backlight brightness data.

14. The local dimming drive method according to claim 12, wherein the verifying whether the first backlight brightness data is correct comprises:

performing a verification operation on data bits in the first backlight brightness data by a preset verification algorithm to obtain verification data;

comparing whether the verification data matches verification bit data in the first backlight brightness data; and in response to that the verification data matches the verification bit data in the first backlight brightness data, the first backlight brightness data is correct.

15. A local dimming drive system, comprising: a mainboard, a backlight panel, and the local dimming drive circuit according to claim 1, wherein the input end of the dimming control circuit is connected to the mainboard, and the output end of the constant current drive circuit is connected to the backlight panel.

16. The local dimming drive system according to claim 15, wherein:

the mainboard comprises an on-chip control system and a liquid crystal module controller, and the on-chip control system is respectively connected to the input end of the dimming control circuit and the liquid crystal module controller;

the on-chip control system is configured to provide the first backlight brightness data and the first vertical synchronization signal to the dimming control circuit; and the on-chip control system is further configured to provide an image signal to the liquid crystal module controller at the refresh rate of the first vertical synchronization signal to control a liquid crystal panel to perform synchronous refresh.

17. The local dimming drive system according to claim 16, wherein:

the mainboard further comprises a power amplifier, and the power amplifier is connected to the on-chip control system; and the on-chip control system is further configured to output an audio signal to the power amplifier so that the power amplifier plays audio synchronously.

18. The local dimming drive system according to claim 15, further comprising:

a power supply unit, wherein the power supply unit is configured to convert an alternating current power supply into power supplies respectively suitable for the backlight panel, the mainboard and the local dimming drive circuit to provide power for each circuit.

19. An electronic equipment, comprising: the local dimming drive circuit according to claim 1 and a backlight panel, wherein the output end of the constant current drive circuit is connected to the backlight panel.

* * * * *